(No Model.) 4 Sheets—Sheet 1.

A. SIEMENS.
METHOD OF OPERATING ELECTRIC MOTORS BY ALTERNATING CURRENTS.

No. 504,630. Patented Sept. 5, 1893.

WITNESSES:

INVENTOR
Alexander Siemens
BY
Geo. H. Benjamin
ATTORNEY.

(No Model.) 4 Sheets—Sheet 2.

A. SIEMENS.
METHOD OF OPERATING ELECTRIC MOTORS BY ALTERNATING CURRENTS.

No. 504,630. Patented Sept. 5, 1893.

WITNESSES:

INVENTOR
Alexander Siemens
BY
Geo. H. Benjamin
ATTORNEY.

(No Model.)　　　　　　　　　　　　　　4 Sheets—Sheet 3.
A. SIEMENS.
METHOD OF OPERATING ELECTRIC MOTORS BY ALTERNATING CURRENTS.

No. 504,630.　　　　　　　　Patented Sept. 5, 1893.

WITNESSES:　　　　　　　　　　　　　　INVENTOR
　　　　　　　　　　　　　　　　　Alexander Siemens
　　　　　　　　　　　　　　　　　　BY
　　　　　　　　　　　　　　　　　　　ATTORNEY.

(No Model.) 4 Sheets—Sheet 4.

A. SIEMENS.
METHOD OF OPERATING ELECTRIC MOTORS BY ALTERNATING CURRENTS.

No. 504,630. Patented Sept. 5, 1893.

WITNESSES:

INVENTOR
Alexander Siemens
BY
Geo. H. Benjamin
ATTORNEY.

UNITED STATES PATENT OFFICE.

ALEXANDER SIEMENS, OF LONDON, ENGLAND, ASSIGNOR TO SIEMENS & HALSKE, OF BERLIN, GERMANY.

METHOD OF OPERATING ELECTRIC MOTORS BY ALTERNATING CURRENTS.

SPECIFICATION forming part of Letters Patent No. 504,630, dated September 5, 1893.

Application filed October 21, 1890. Serial No. 368,860. (No model.)

*To all whom it may concern:*

Be it known that I, ALEXANDER SIEMENS, a citizen of England, residing at 12 Queen Anne's Gate, Westminster, London, county of Middlesex, England, have invented a Method of Applying Alternating Electric Currents to the Production of Motive Power, of which the following is a specification.

Before the year 1884, continuous electric currents produced from a dynamo electric machine had been successfully applied to give motion to an electric motor, constructed and arranged as a continuous current dynamo electric machine, the generator and the motor being thus of similar character. As alternating current systems of distribution are preferable for many reasons, it is important that power should be transmitted as economically and efficiently by these systems as by the continuous current systems. It is therefore very important that we shall have a motor which is capable of receiving alternating currents and being rotated thereby, and which is capable of transforming electrical energy to mechanical power efficiently and practically. It has hitherto been found difficult to find a motor machine that would start and reach the proper working speed under the influence of alternating currents. In order to overcome these difficulties, I made a series of experiments, to which I referred at a meeting of the Society of Telegraphic Engineers and Electricians, on the 13th of November, 1884, an account of which meeting is published in Vol. XIII of the journal of that society, pages 527 and 528. According to my present invention, I am enabled to utilize alternating electric currents in the production of motive power by combining with a generator of alternating currents a motor, constructed and arranged as a continuous dynamo electric machine, but having its field magnets and armature built up of soft iron wires or laminæ, in order that they may be capable of rapid alternations of magnetism.

My invention depends upon the following principle, viz: that if you send a current of a certain direction through the field magnet and the armature coils of an ordinary direct current dynamo machine, so that the poles of the respective elements will be of a certain sign (being magnetized in a certain direction) and, if through the same armature and field magnet coils, you send a current of opposite polarity, although you reverse the absolute poles of the two elements, they still retain the same relation; therefore, under current of either direction (the relation of the elements being the same as the circuits), the rotation will always be in the same direction. Therefore, it is obvious that if the field magnet and armature cores are sufficiently responsive to cause rapid magnetic changes, (that is if they are formed of bundles of iron wire, or are sufficiently highly laminated) they will respond to the changes of polarity induced by the alternating current in a sufficient degree to cause a continuous rotation of the armature of the motor under the action of said current. Therefore, the action of the machine would be in substance the same as if it were impelled by a continuous current, and irrespective of whether the machine's elements are coupled in series or shunt. In other language, if the parts are so arranged that a continuous + current supplied to the machine would cause the armature to turn to the right; with the same arrangement of parts, a continuous − current would also cause the armature to turn to the right, because the change of sign of the current, while it reverses its direction in the armature coils, also reverses the polarity of the field magnets. It therefore follows that if the field magnets, and armature, as I before stated, are capable of a sufficiently rapid reversal of their polarities, the machine could be worked with alternating currents, and that without involving any extraneous means for starting, or without rendering its speed in any way dependent upon that of the generator. It is important that the phases of magnetization of the cores of the field magnets and the armature should be as nearly the same as possible in order that the respective polarities in the armature and the field magnets shall occur at approximately the same time.

In order to more fully understand my invention, I will describe it in connection with the following drawings, in which—

Figure 1 shows my motor in circuit with an alternating generator,—the armature and field magnet coils being in series with each other. Fig. 2 shows my motor connected with an alternating generator,—the field magnet and armature coils being in shunt to each other. The cores of the armature and field magnets are, as shown, either laminæ or composed of bundles of wire. Fig. 3 is a cross vertical section of my motor showing the laminated field magnets. Fig. 4 is a longitudinal vertical section of my motor showing the field magnets, the armature, the commutator and the pulley for transmitting power.

Referring to Fig. 1, G indicates a generator of alternating currents, shown here as of the Siemens type of alternating generator; P is a pulley by which the generator receives its power from an engine which drives it. L L' are line wires which conduct the alternating current from the usual collector rings and brushes on the generator to the motor M. The motor is similar in construction to the ordinary type of Siemens' direct current dynamo electric machine,—the only difference being that both the field magnets and armature have cores which respond rapidly to changes of magnetism (that is, cores which are highly laminated, or composed of bundles of iron wire properly insulated from each other to prevent eddy currents). A is the armature of the said motor, wound like the ordinary Siemens armature of the direct current generator type. F are the field magnets of the machine, shown here as wound with coils connected in series with the armature. C is the commutator upon which rest brushes B, one of which is connected to one of the line wires, and the other, to the return wire from the field magnets.

Figure 1:
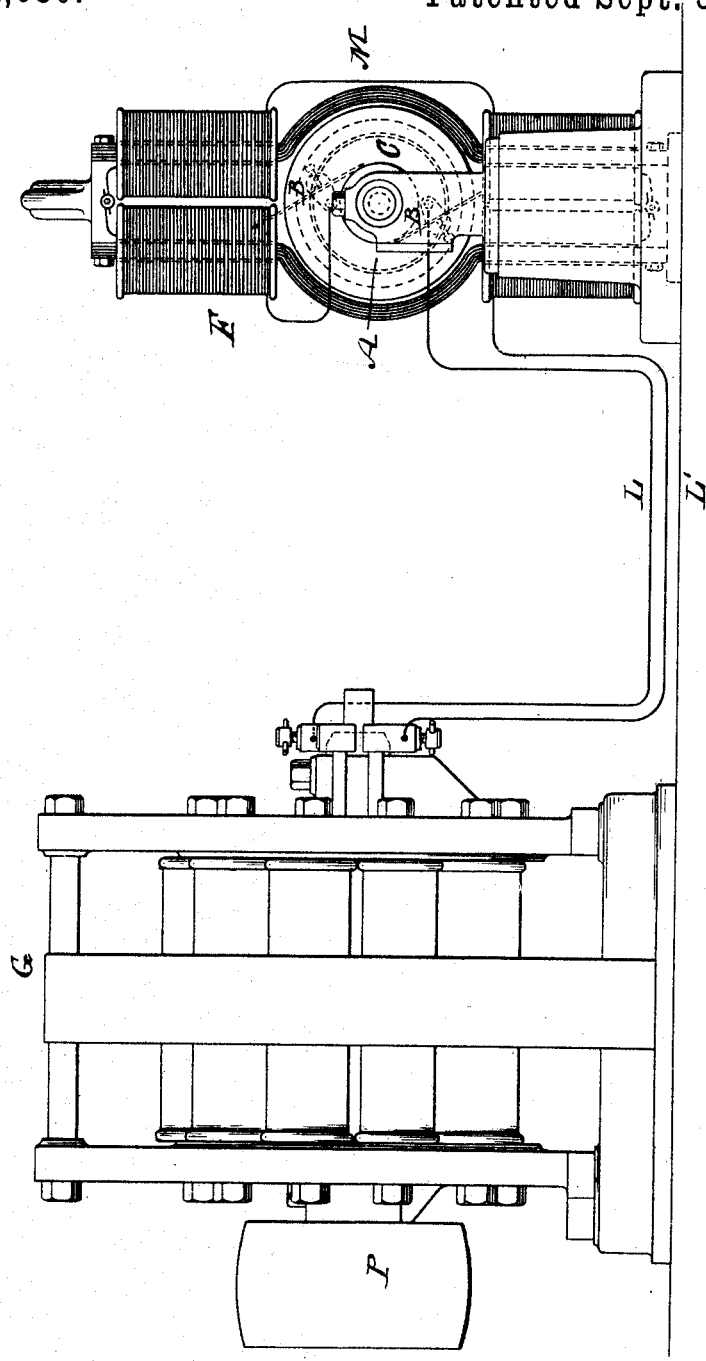
Figure 2:
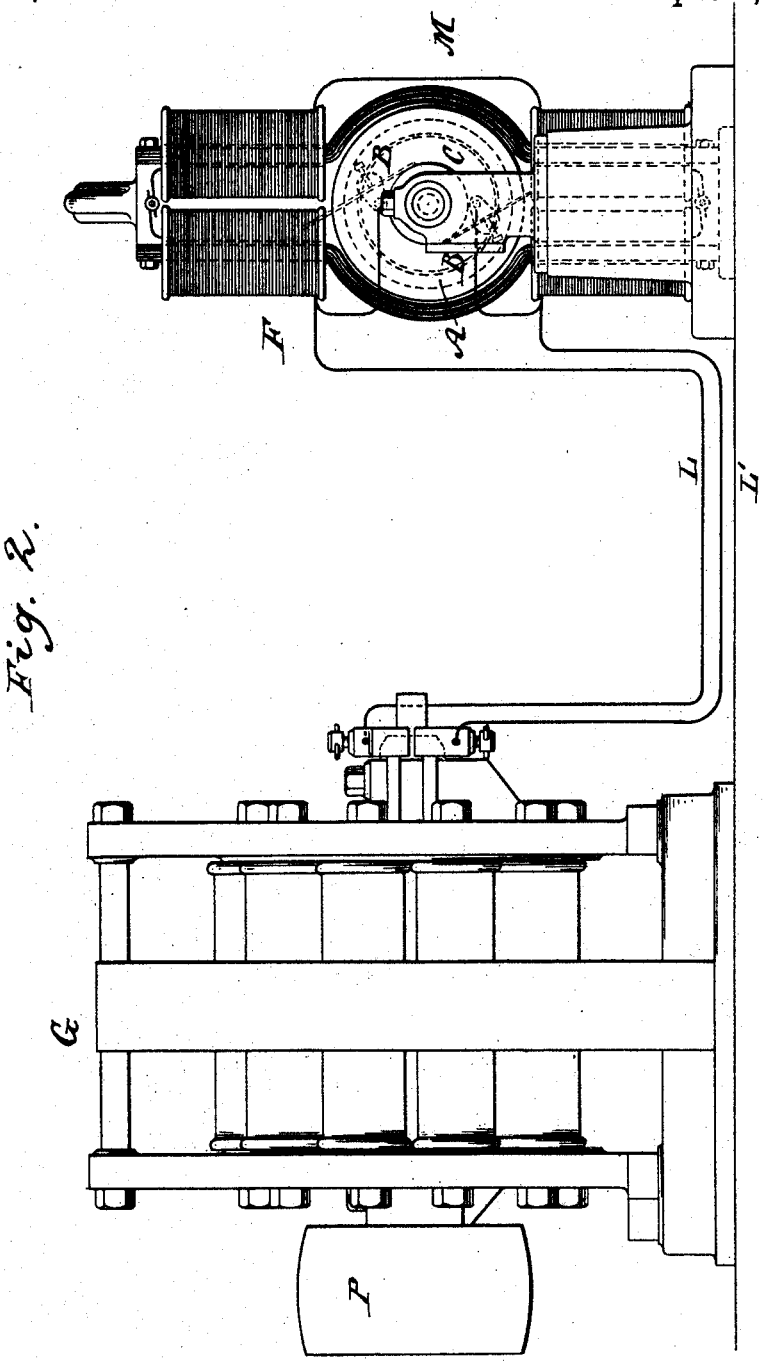
Fig. 2 shows a similar arrangement of apparatus, except that the field magnets and armature have their coils connected in shunt or in parallel to each other.
Figure 3:
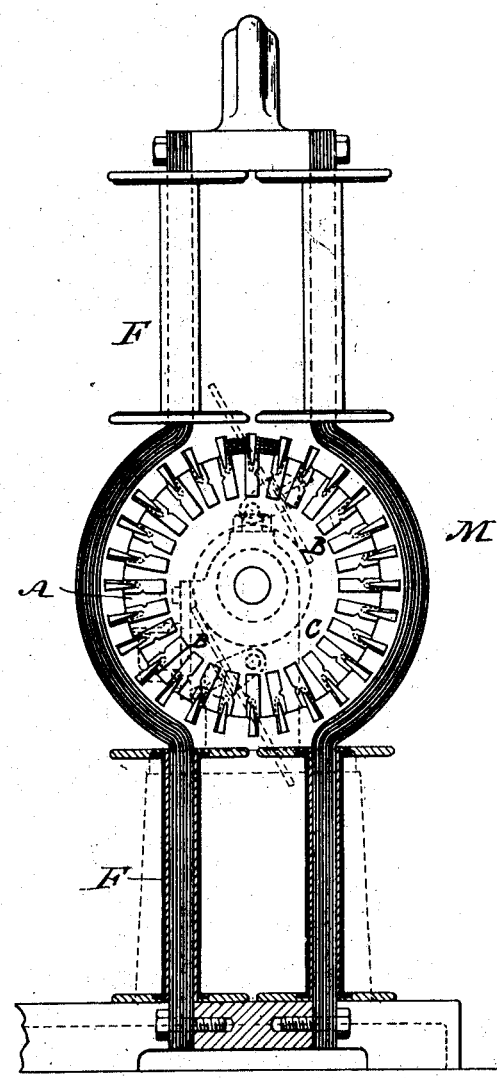
Fig. 3 shows a vertical cross section of the machine with its field magnets and armature, commutator and brushes,—the cores of the field magnets being shown as properly laminated to respond to the rapid reversals of magnetism.
Figure 4:
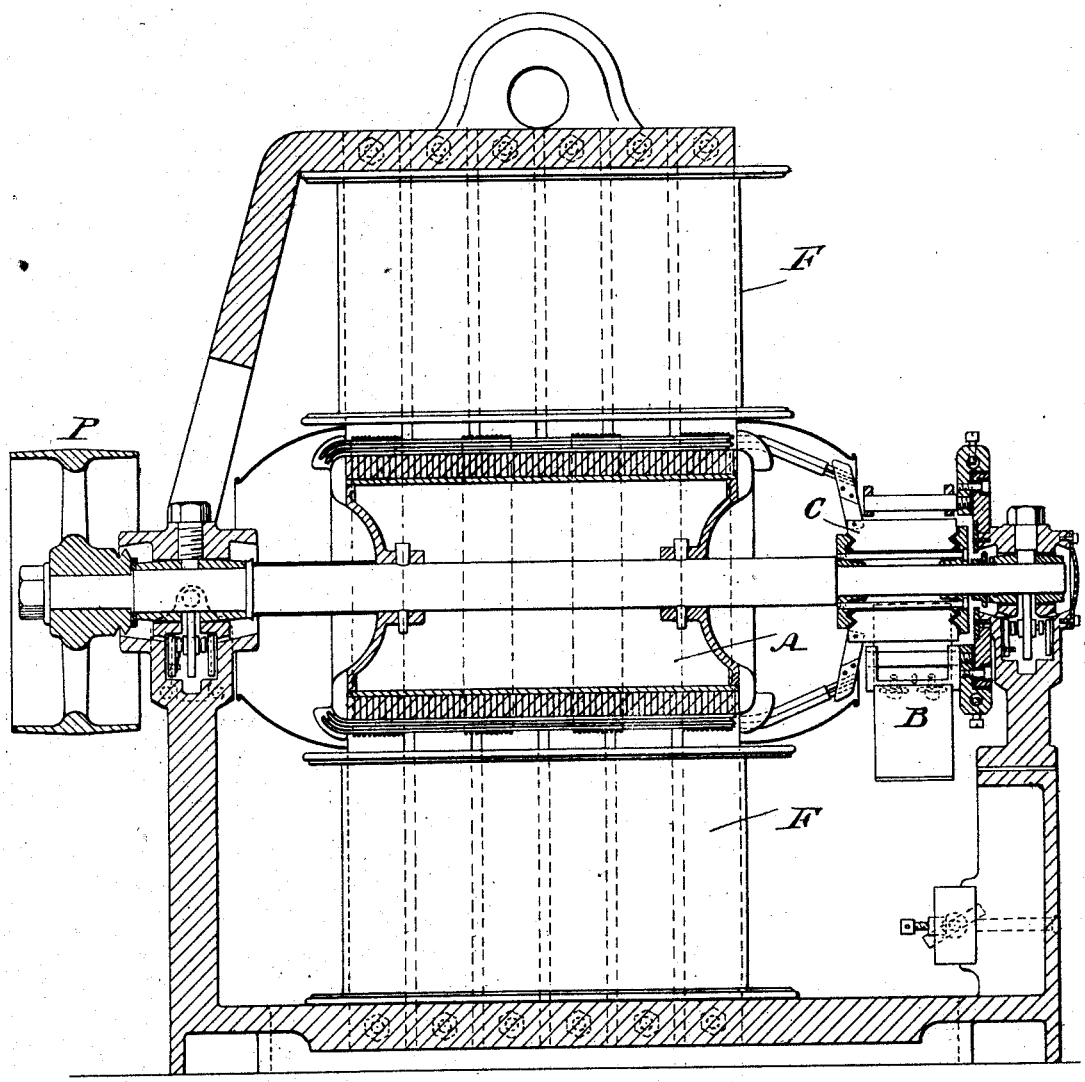
Fig. 4 shows a longitudinal vertical section of the motor.

I consider that I am the first to discover the fact that a motor may be driven by an alternating current and convert electrical energy into mechanical motion without any external means of starting whatever being necessary. In other words, I have invented a motor which is capable of being run by an alternating current, practically and efficiently, and capable of starting under load, with substantially the same efficiency that a direct current can be started, provided the field magnets and the armature cores are so proportioned and constructed as to respond approximately at the same time to the changes of magnetization.

Having described my invention, I claim—

1. The method of producing mechanical motion from electrical energy, which consists in generating an alternating current, transmitting it to a local point of consumption, and there producing in a motive device a succession of alternating polarities in the respective elements of the said device, so as to maintain their relation the same although their absolute polarities change.

2. The method of producing mechanical motion from electrical energy, which consists in producing in one element of a motive device, a field of alternating polarity, and producing a successive advancing field of alternating polarity in the other element of the motive device, and causing the polarities to so succeed each other that their relative polarities remain unchanged.

3. The combination of an alternating generator, a line circuit extending therefrom, a self-starting motive device connected to said line circuit, having one of its elements excited by an uncommutated current, and the other of its elements excited by a commutated current, substantially as described.

In testimony whereof I have signed my name to this specification, in the presence of two subscribing witnesses, this 10th day of October, A. D. 1890.

ALEXANDER SIEMENS.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*